United States Patent
Sugiyama

(10) Patent No.: US 10,362,620 B2
(45) Date of Patent: Jul. 23, 2019

(54) ELECTRONIC DEVICE, METHOD FOR CONTROLLING SAME AND COMPUTER-READABLE STORAGE MEDIUM STORING CONTROL PROGRAM

(71) Applicant: CASIO COMPUTER CO., LTD., Tokyo (JP)

(72) Inventor: Junichi Sugiyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 151 days.

(21) Appl. No.: 15/248,122

(22) Filed: Aug. 26, 2016

(65) Prior Publication Data
US 2017/0064767 A1    Mar. 2, 2017

(30) Foreign Application Priority Data

Aug. 27, 2015 (JP) ................................. 2015-167399

(51) Int. Cl.
*H04W 76/25* (2018.01)
*H04W 4/02* (2018.01)

(52) U.S. Cl.
CPC ........... *H04W 76/25* (2018.02); *H04W 4/027* (2013.01)

(58) Field of Classification Search
CPC .... G01C 17/02; H04W 4/027; H04W 76/045; H04W 76/25
See application file for complete search history.

(56) References Cited

U.S. PATENT DOCUMENTS

| | | | |
|---|---|---|---|
| 8,385,964 B2* | 2/2013 | Haney | H04W 4/21 455/519 |
| 8,433,943 B2* | 4/2013 | Lin | G06F 1/263 713/300 |
| 8,467,726 B2 | 6/2013 | Shirakata et al. | |
| 9,504,425 B2* | 11/2016 | Jooste | A61B 5/6898 |
| 9,591,118 B2* | 3/2017 | Graumann | G06F 3/011 |
| 2005/0181734 A1* | 8/2005 | Coutts | H04W 48/18 455/67.16 |

(Continued)

FOREIGN PATENT DOCUMENTS

| | | |
|---|---|---|
| JP | 2005-342254 A | 12/2005 |
| JP | 2010-264246 A | 11/2010 |

(Continued)

OTHER PUBLICATIONS

Notification of Reasons for Refusal dated Apr. 12, 2019 issued in Japanese Patent Application No. 2015-167399.

*Primary Examiner* — Khaled M Kassim
(74) *Attorney, Agent, or Firm* — Scully Scott Murphy & Presser

(57) ABSTRACT

An electronic device includes a wireless communication circuit section which intermittently executes connection with another electronic device by wireless communication, a sensor section which outputs sensor data related to the movement of the electronic device, and a control section. When the electronic device is making a periodic movement, the control section acquires the cycle of the periodic movement of the electronic device based on the sensor data, and causes the wireless communication circuit section to set connection timing for connecting the electronic device with the another electronic device by the wireless communication to periodic timing based on the cycle.

18 Claims, 14 Drawing Sheets

(56) References Cited

U.S. PATENT DOCUMENTS

| | | | |
|---|---|---|---|
| 2009/0058635 A1* | 3/2009 | LaLonde | A61N 1/37282 340/539.11 |
| 2011/0294429 A1 | 12/2011 | Shirakata et al. | |
| 2012/0003933 A1* | 1/2012 | Baker | H04W 76/38 455/41.2 |
| 2012/0015665 A1* | 1/2012 | Farley | G01S 5/0036 455/456.1 |
| 2012/0140601 A1* | 6/2012 | Nakagawa | G04G 19/12 368/10 |
| 2014/0200470 A1* | 7/2014 | Puolakanaho | A61B 5/0002 600/509 |
| 2015/0029056 A1* | 1/2015 | Yanagidate | H01Q 3/26 342/367 |
| 2015/0119105 A1* | 4/2015 | Amgar | H04M 1/72522 455/557 |
| 2015/0135284 A1* | 5/2015 | Bogard | G06F 21/35 726/5 |
| 2015/0181634 A1* | 6/2015 | Cheng | H04W 4/026 455/426.1 |
| 2015/0187187 A1* | 7/2015 | Del Toro | H04M 1/7253 340/539.11 |
| 2015/0350972 A1* | 12/2015 | Rao | H04W 36/32 455/441 |
| 2016/0026425 A1* | 1/2016 | Lee | G06F 3/0416 345/2.2 |
| 2016/0059120 A1* | 3/2016 | Komorous-King | A63F 13/211 463/36 |
| 2016/0117141 A1* | 4/2016 | Ro | G06F 3/1454 715/748 |
| 2016/0153853 A1* | 6/2016 | Brenner | G01L 5/047 702/155 |
| 2016/0360021 A1* | 12/2016 | Cho | G06F 9/542 |
| 2017/0104831 A1* | 4/2017 | Fransen | H04L 67/148 |
| 2017/0151928 A1* | 6/2017 | Kang | B60R 25/01 |
| 2018/0048341 A1* | 2/2018 | Shin | H04B 1/385 |

FOREIGN PATENT DOCUMENTS

| | | |
|---|---|---|
| JP | 2013-022188 A | 2/2013 |
| WO | 2011/055477 A1 | 5/2011 |

\* cited by examiner

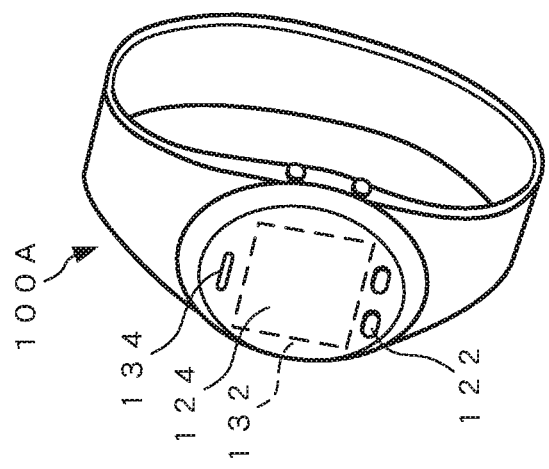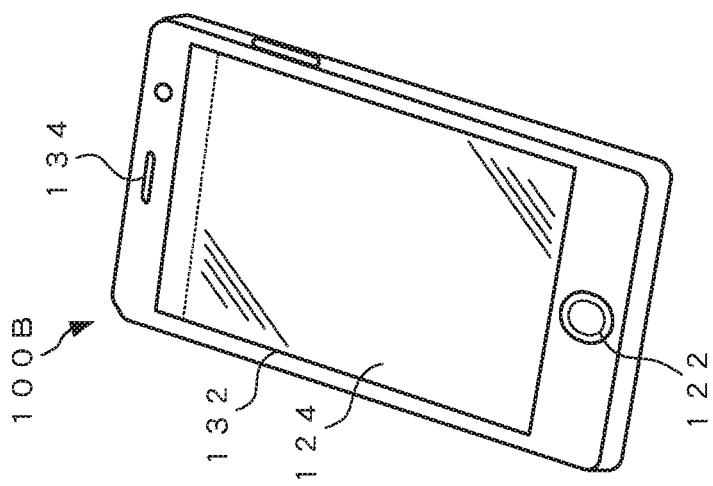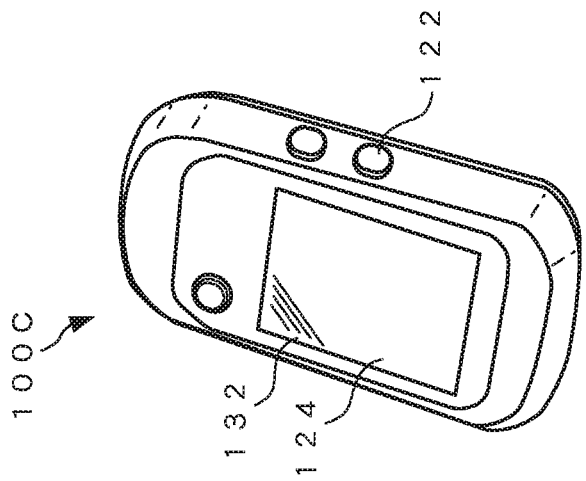

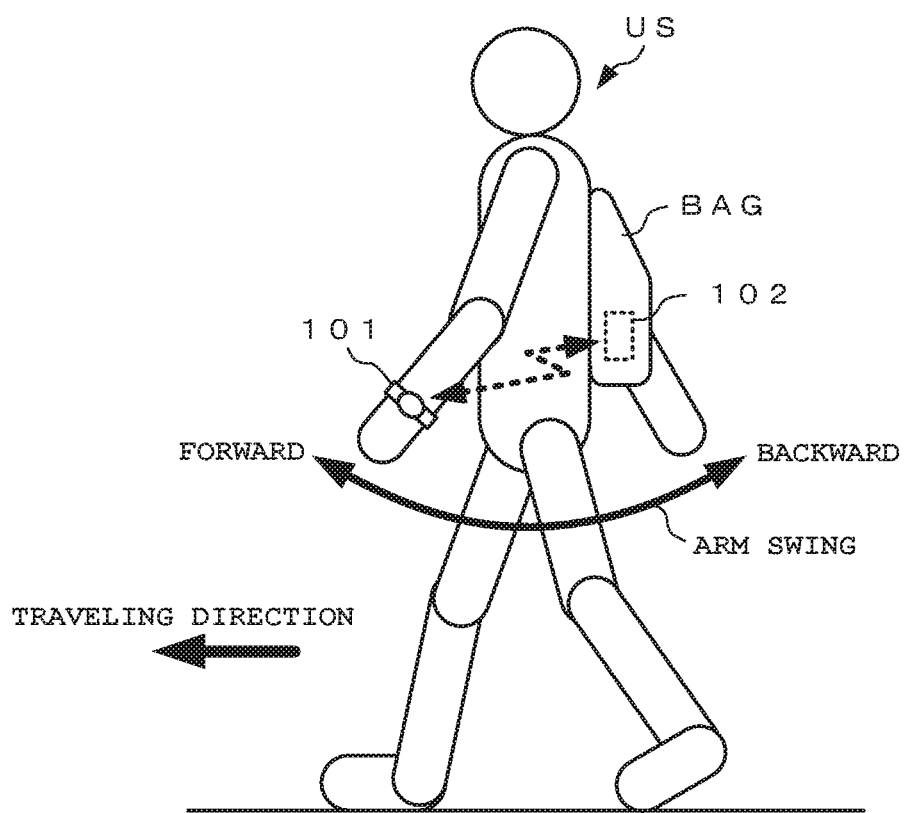

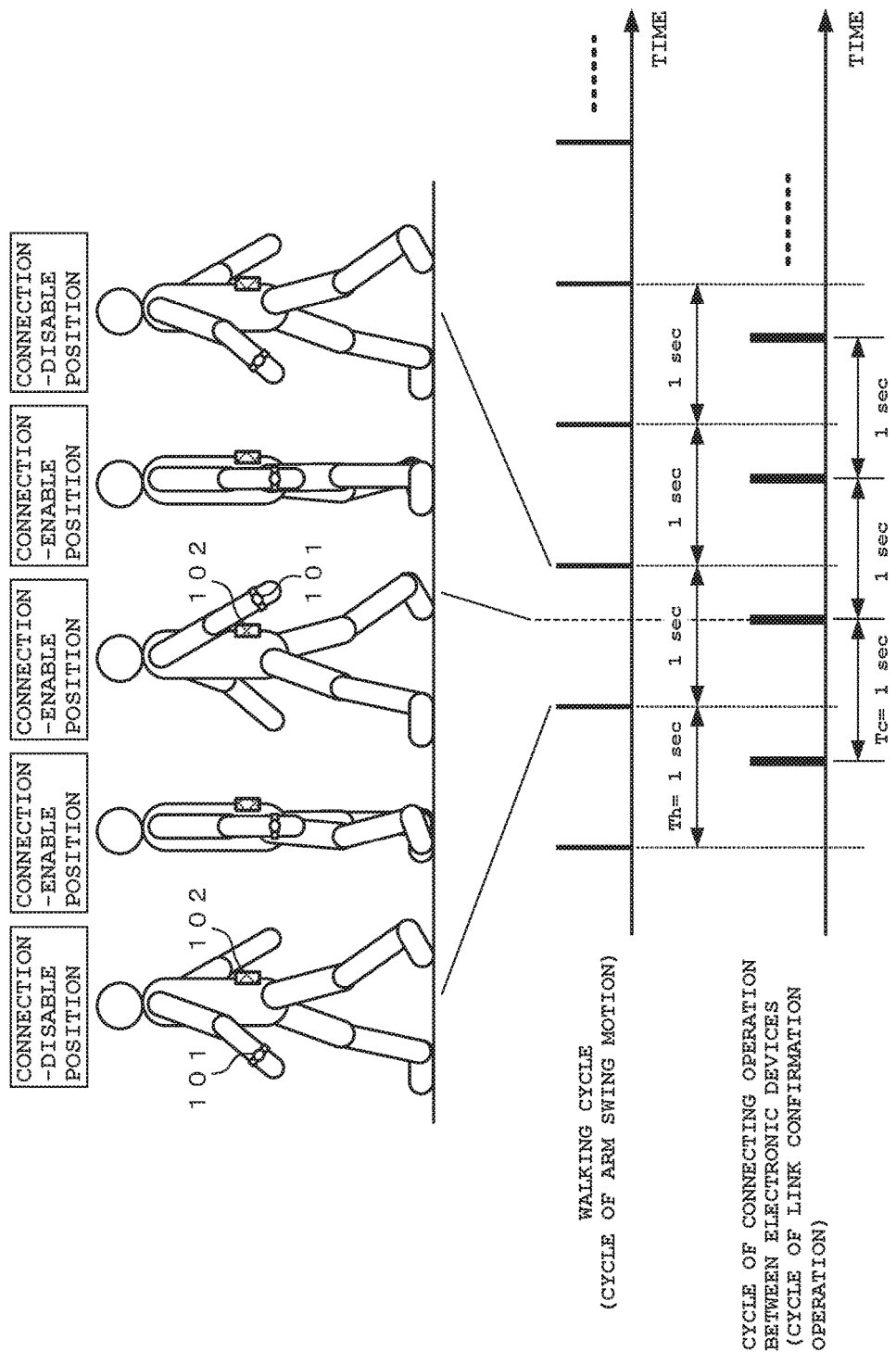

ELECTRONIC DEVICE, METHOD FOR CONTROLLING SAME AND COMPUTER-READABLE STORAGE MEDIUM STORING CONTROL PROGRAM

CROSS-REFERENCE TO RELATED APPLICATION

This application is based upon and claims the benefit of priority from the prior Japanese Patent Application No. 2015-167399, filed Aug. 27, 2015, the entire contents of which are incorporated herein by reference.

BACKGROUND OF THE INVENTION

1. Field of the Invention

The present invention relates to an electronic device having a wireless communication function which is worn on or carried by a user, a method for controlling the electronic device, and a computer-readable storage medium having an electronic device control program stored thereon.

2. Description of the Related Art

In recent years, portable electronic devices such as smartphones (high-functionality portable telephones), smartwatches, digital cameras, and GPS (Global Positioning System) loggers are prevalent which have a wireless communication function to connect to an external device by wireless communication for the transmission and reception of various information and data.

For example, Japanese Patent Application Laid-Open (Kokai) Publication No. 2010-264246 discloses a technique in which a portable fitness monitoring device worn on the waist of an athlete (user) and a visual display device worn on the wrist of the athlete are connected by wireless communication and predetermined data such as a heart rate is transmitted to the visual display device to be provided to the athlete.

In these electronic devices, for example, techniques have been adopted in which an antenna of a patch type, film type, or the like is used to decrease the size of an electronic device, and the housing of the device or an inner metal component is used to improve antenna sensitivity.

By this improved antenna performance and the like, wireless communication between these electronic devices has become more stable.

However, when these devices are being carried by a user or have been worn on the body (in particular, any of the extremities) for use, a positional relation between the electronic devices may be significantly changed due to the motion, orientation, or the like of the body performing an exercise such as a walking exercise or a running exercise, which affects the communication statuses of both devices.

In particular, if a substance (shield) such as the human body which hardly conducts electric waves is interposed between the electronic devices, the communication status tends to become unstable, and wireless communication may be interrupted. Note that the communication status when electronic devices are being carried or have been worn on a user for use will be described in detail in comparative verification in embodiments described below.

SUMMARY OF THE INVENTION

The present invention has an advantage of providing an electronic device and a method for controlling the same by which favorable communication quality is maintained between an electronic device having a wireless communication function which has been worn on or is being carried by a user and another electronic device that has been worn on or is being carried by a user.

In accordance with one aspect of the present invention, there is provided an electronic device comprising: a wireless communication circuit section which intermittently executes connection with another electronic device by wireless communication; a sensor section which outputs sensor data related to a movement of the electronic device; and a control section which acquires a cycle of a periodic movement of the electronic device based on the sensor data, and causes the wireless communication circuit section to set connection timing to periodic timing based on the cycle, wherein the connection timing is timing for connecting the electronic device with the another electronic device by the wireless communication.

In accordance with another aspect of the present invention, there is provided a method for controlling an electronic device including a wireless communication circuit section which intermittently executes connection with another electronic device by wireless communication, a sensor section which outputs sensor data related to a movement of the electronic device, and a control section which controls the wireless communication circuit section, comprising: a step of acquiring a cycle of a periodic movement of the electronic device based on the sensor data; and a step of causing the wireless communication circuit section to set connection timing to periodic timing based on the cycle, wherein the connection timing is timing for connecting the electronic device with the another electronic device by the wireless communication.

In accordance with another aspect of the present invention, there is provided a non-transitory computer-readable storage medium having stored thereon a control program for an electronic device including a wireless communication circuit section which intermittently executes connection with another electronic device by wireless communication, a sensor section which outputs sensor data related to a movement of the electronic device, and a computer which controls the wireless communication circuit section, the program being executable by the computer to actualize functions comprising: processing for acquiring a cycle of a periodic movement of the electronic device based on the sensor data; and processing for causing the wireless communication circuit section to set connection timing to periodic timing based on the cycle, wherein the connection timing is timing for connecting the electronic device with the another electronic device by the wireless communication.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1A, FIG. 1B, and FIG. 1C are schematic structural diagrams showing examples of an electronic device according to the present invention;

FIG. 2 is a schematic diagram showing an example of the attachment of an electronic device of a first embodiment to the human body;

FIG. 14 is a timing chart showing an example of a relation between arm swing motions and connection timings in a wireless communication operation between electronic devices in the wireless communication control method according to the second embodiment.

DETAILED DESCRIPTION OF THE PREFERRED EMBODIMENTS

Embodiments of an electronic device and its control method according to the present invention will hereinafter be described in detail with reference to the drawings.

In the following embodiments, an example is described in which a user wearing an electronic device according to the present invention is performing a walking exercise. However, the exercise in the present invention may be any exercise as long as an extremity having the electronic device carried thereby or worn thereon is periodically moved. Examples of the exercise include running, cycling, mountaineering, and the like.

First Embodiment (Electronic Device)

FIG. 1A, FIG. 1B, and FIG. 1C are schematic structural diagrams showing examples of an electronic device according to the present invention.

FIG. 2 is a schematic diagram showing an example of the attachment of the electronic device of the present embodiment to the human body.

Figure 3:
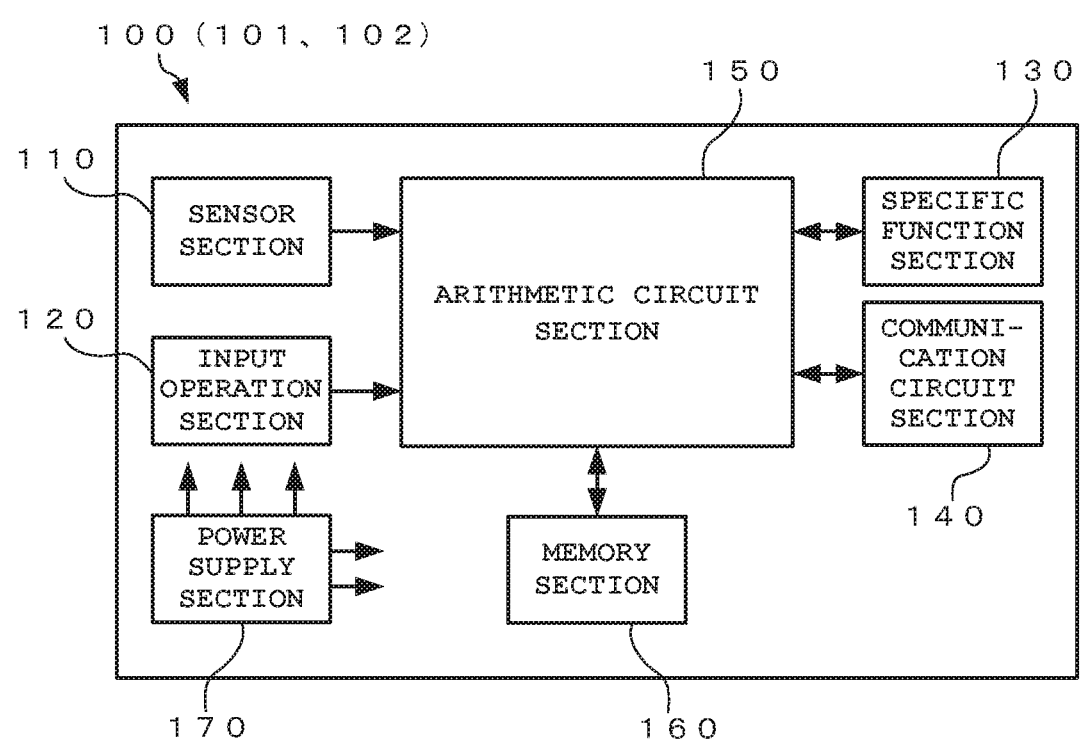
FIG. 3 is a functional block diagram of each electronic device applied in the first embodiment.

FIG. 3 is a functional block diagram of each electronic device applied in the present embodiment.

Figure 4:
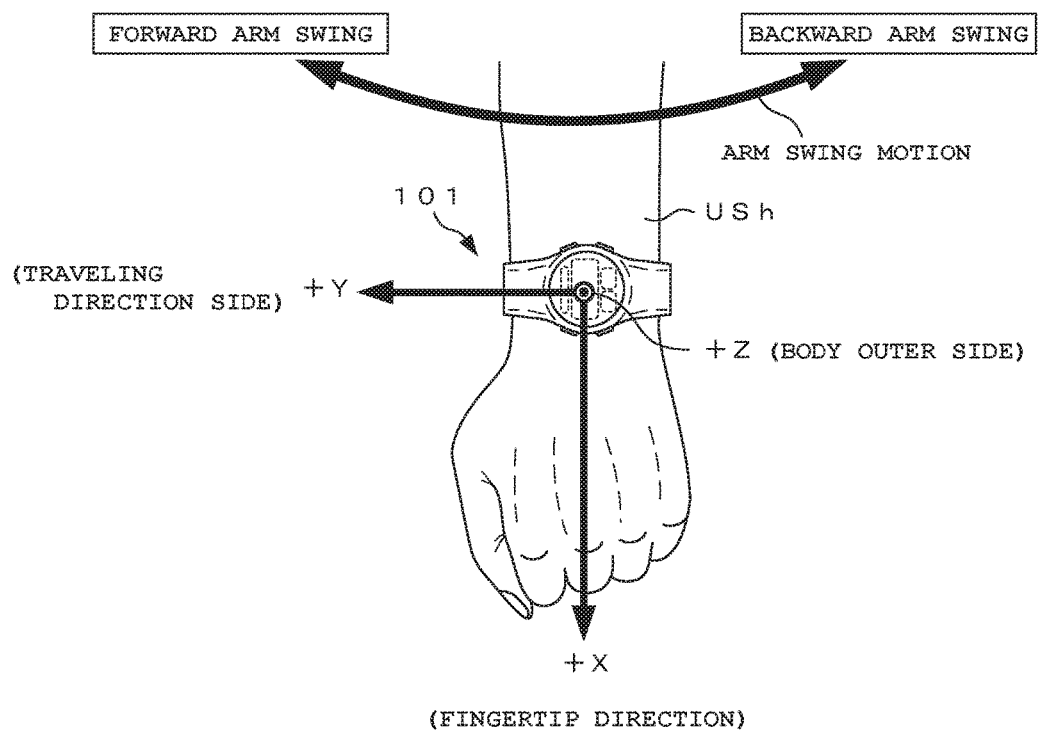
FIG. 4 is a schematic diagram showing an example of axial directions defining sensor data in a motion sensor applied in the first embodiment.

FIG. 4 is a schematic diagram showing an example of axial directions defining sensor data in a motion sensor applied in the present embodiment.

The electronic device according to the present invention includes a wireless communication function for transmitting and receiving various information and data to and from at least another electronic device, and has a shape allowing it to be carried by a user or a shape allowing it to be worn on a predetermined body part of the user.

Specifically, as an electronic device in the present invention, for example, a wearable device 100A of a wristwatch-type, wristband-type, or the like can be applied which has a shape allowing it to be worn on a predetermined body part (any of the extremities such as wrist or neck), as shown in FIG. 1A.

In addition, as an electronic device in the present invention, a smartphone 100B or tablet terminal which is significantly prevalent in recent years can be applied, as shown in FIG. 1B. Moreover, an outdoor device (so-called GPS logger or navigation terminal) 100C which records a movement track in mountaineering and provides a route guide can be applied, as shown in FIG. 1C.

These various devices shown in FIG. 1A, FIG. 1B, and FIG. 1C are hereinafter referred to as "electronic device 100" for convenience of explanation.

In the present embodiment, the electronic device 100, which is one of the above-described electronic devices, is carried by a user US or worn on a predetermined body part of the user US, as shown in FIG. 2.

Specifically, for example, the wearable device 100A is worn on an extremity of the user US such as a wrist or an arm, and the smartphone 100B and the outdoor device 100C are accommodated in a bag BAG, backpack, or the like which is carried in close contact with the body of the user US.

Here, in the present embodiment, a plurality of electronic devices 100 are carried by or worn on the user US, and at least one of the plurality of electronic devices 100 is carried by or worn on a body part (for example, one of the extremities) that repeats periodic movements in accordance with the user's motion, orientation, or the like during exercise.

In an area between the plurality of electronic devices 100 which are being carried by or have been worn on the user US, a human body part or a shield made of metal or the like which hinders electric waves for wireless communication are partially interposed.

The arrangement of the electronic devices 100 may be set intentionally or inevitably in accordance with the motion, orientation, or the like of the user US during exercise.

In the following descriptions, of the two electronic devices 100 paired and connected by wireless communication as shown in FIG. 2, the wearable device 100A worn on a wrist, an arm, or the like of the user US is referred to as "first electronic device 101" and the smartphone 100B accommodated in the bag BAG to be carried by the user US is referred to as "second electronic device 102" for convenience of explanation.

Note that the arrangement of the respective electronic devices 100 (the first electronic device 101 and the second electronic device 102) shown in FIG. 2 is merely an example, and the present invention is not limited thereto.

For example, there are cases in which, in place of the smartphone 100B accommodated in the bag BAG, the smartphone 100B or the outdoor device 100C is directly attached to the clothes, belt, or the like on the waist on the back side of the user US with a clip or accommodated in a pocket.

Also, there are cases in which, in place of the wearable device 100A worn on the wrist, the outdoor device 100C is worn on the wrist, or the user US directly holds and carries the smartphone 100B by hand.

Specifically, the wearable device 100A, the smartphone 100B, and the like applied as the electronic devices 100 (the first electronic device 101 and the second electronic device 102) include, for example, a sensor section 110, an input operating section 120, a specific function section 130, a communication circuit section 140, a control section 150, a memory section 160, and a power supply section 170, as shown in FIG. 3.

Here, the control section 150 corresponds to a cycle acquiring section, a timing setting section, a communication status judging section, and an exercise status acquiring section according to the present invention.

In the present embodiment, the first electronic device 101, such as the wearable device 100A which is worn on a wrist of the user US, has the sensor section 110 as an essential section, as shown in FIG. 2. On the other hand, the second electronic device 102, such as the smartphone 100B which is accommodated in the bag BAG, is not required to have the sensor section 110.

The sensor section 110 has at least a motion sensor which outputs a detection signal in response to the motion, orientation, and the like of the user US, such as an acceleration sensor, angular velocity sensor (gyro sensor), geomagnetic sensor, or atmospheric sensor, and includes at least one of the above-described sensors.

In the sensor section 110, a detection signal which is constantly or periodically outputted based on the motion, orientation, and the like of the user US is transmitted as sensor data to the control section 150, associated with time data, and stored in the memory section 160.

Specifically, for example, in a structure where the sensor section 110 has an acceleration sensor as a motion sensor, the acceleration sensor has a triaxial acceleration sensor to detect acceleration (acceleration signal) along each of three axes orthogonal to one another for output as acceleration data.

In the present embodiment, the first electronic device 101 having the acceleration sensor is worn on a wrist USh such that, among the directions in which an arm of the user US can extend, a fingertip direction (downward direction in the drawing; normal line direction) is taken as +X-axis direction, a direction that is orthogonal to the arm extending direction (X-axis) on a traveling direction (forward) side of the walking user US (leftward direction in the drawing; tangential line direction) is taken as a +Y-axis direction, and a direction orthogonal to the X-Y plane (plane of the drawing) on the exterior side of the body (front direction of the drawing) is taken as a +Z-axis direction, as shown in FIG. 4.

In this case, as shown in FIG. 2, periodic arm swing motions in the traveling direction (forward) and the opposite direction while the user US is walking are performed substantially on the above-described X-Y plane as shown in FIG. 4. The X-axis which is the direction in which the arm of the user US extends is a normal line direction and the Y-axis orthogonal to the X-axis is a tangential line direction with respect to an arc-shaped track of the user's arm swing motion.

Note that sensor data acquired by the sensor section 110 may be used by the control section 150 when a predetermined exercise status of the user US, such as the user's activity amount, traveling distance, moving speed, or exercise orientation (form) during a walking exercise, is acquired.

The input operating section 120 is used for a power ON/OFF operation for the electronic device 100 and an operation for setting and performing various functions.

Specifically, the input operating section 120 has, for example, an input device such as a button switch 122 and key switch (omitted in the drawings) that are provided on the housings of the wearable device 100A and the smartphone 100B applied as the electronic devices 100, and a touch panel 124 that is arranged on the front surface (visual field side of the user US) of a display section 132 provided as the specific function section 130 described below, as shown in FIG. 1A, FIG. 1B, and FIG. 1C.

The specific function section 130 performs a specific function by following an instruction from the control section 150 described below.

Specifically, the specific function section 130 may perform functions for the display section 132 and an acoustic section 134 which provide predetermined information to the user, an imaging section (omitted in the drawing) which captures an image and video, a GPS circuit section (omitted in the drawing) which acquires a current position of the user, as shown in FIG. 1A, FIG. 1B, and FIG. 1C.

The communication circuit section 140 has at least a function for connecting the first electronic device 101 and the second electronic device 102 by a predetermined wireless communication method and transmitting and receiving various information and data.

In particular, in the communication circuit section 140 of the present embodiment, the connection timing of a wireless communication operation between electronic devices is set based on the cycle of an arm swing motion (that is, change in a positional relation between the first electronic device 101 and the second electronic device 102) of the user US acquired based on sensor data acquired by the above-described sensor section 110.

The communication circuit section 140 performs a wireless communication operation at the above-described connection timing so as to perform, between the first electronic device 101 and the second electronic device 102, mutual transmission and reception of sensor data acquired by the sensor section 110 and various information and data regarding the exercise status of the user US acquired by the control section 150 based on the sensor data.

Here, in the communication circuit section 140, as a wireless communication method for transmission and reception of various signals and data between the electronic devices, Bluetooth (registered trademark) communication, Bluetooth (registered trademark) Low Energy communication, wireless LAN (Local Area Network) communication, NFC (Near Field Communication), or the like can be applied.

The control section 150 is an arithmetic processing device (computer) such as a CPU (Central Processing Unit) or MPU (Microprocessor) having a clock function, and controls a sensing operation in the sensor section 110, a specific function execution operation in the specific function section 130, a wireless communication operation in the communication circuit section 140, and the like by executing a predetermined program.

In particular, in the present embodiment, by acquiring the cycle of the user's arm swing motion based on sensor data acquired by the sensor section 110, the control section 150 judges a change pattern of the positional relation between the first electronic device 101 and the second electronic device 102, and controls the connection timing of a wireless communication operation between the first electronic device 101 and the second electronic device 102 in the communication circuit section 140 based on the cycle of the arm swing motion.

The control section 150 acquires, based on the sensor data acquired by the sensor section 110, various information and data regarding the exercise status of the user US, and controls mutual transmission and reception between the first electronic device 101 and the second electronic device 102 via the communication circuit section 140 at the above-described connection timing.

The memory section 160 stores data and the like acquired or generated (acquired) in the control section 150, the sensor section 110, the specific function section 130, the communication circuit section 140, and the like in a predetermined storage area.

Note that the memory section 160 may be partially or entirely in a form of a removable storage medium such as a memory card, and may be structured to be removable from the electronic device 100.

The power supply section 170 supplies driving electric power to each section inside the electronic device 100. As this power supply section 170, for example, a primary battery such as a commercially-available button-shaped battery, a secondary battery such as a lithium-ion battery, or a power supply by energy harvest technology for generating electricity by energy such as vibrations, light, heat, electromagnetic waves, etc can be used singly or in combination.

(Electronic Device Control Method)

Next, an electronic device control method (wireless communication control method) according to the present embodiment is described with reference to the drawings.

An exercise support method described below is achieved by executing a predetermined control program in the control section 150 of the first electronic device 101 which repeats periodic movements in response to the motion, orientation, and the like of the exercising user US.

Figure 5:
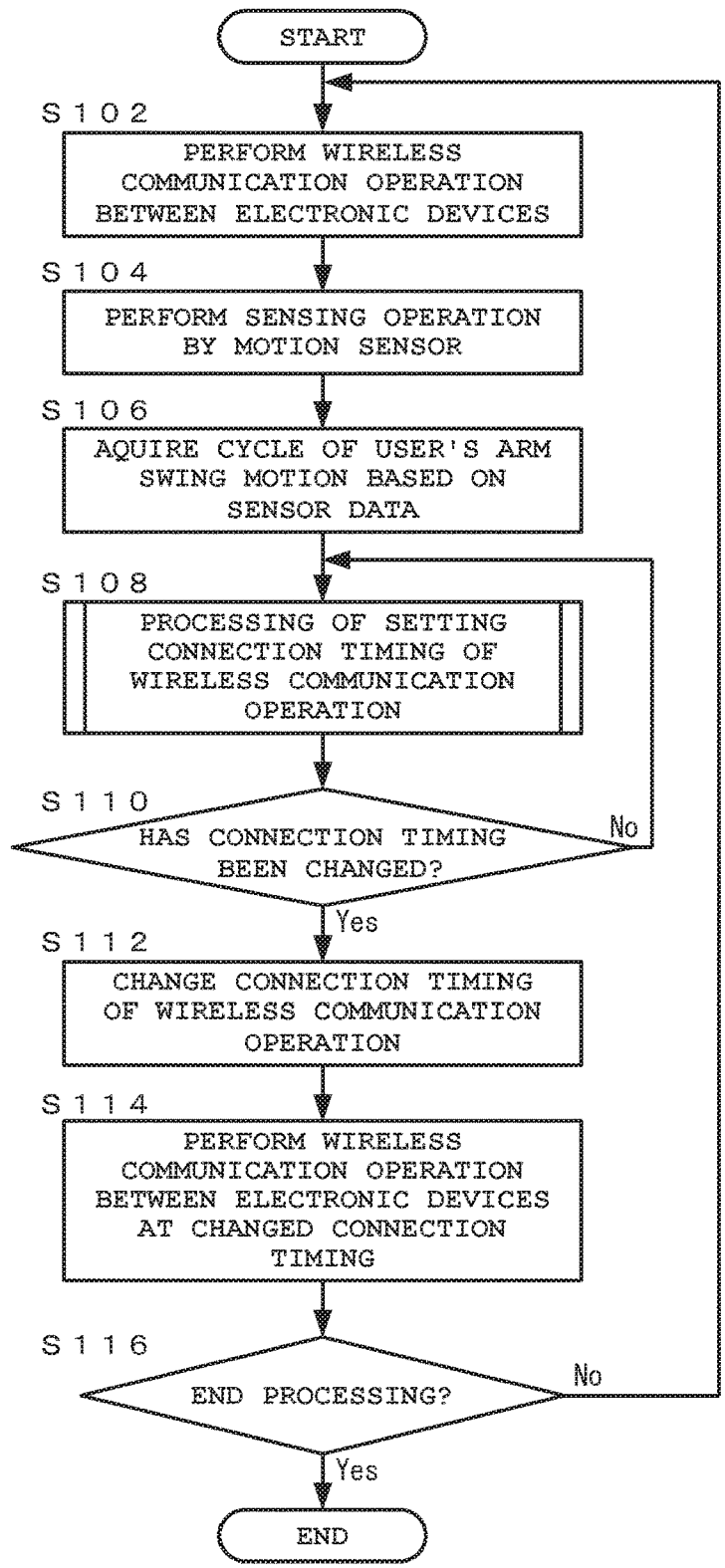
FIG. 5 is a flowchart showing an example of a wireless communication control method according to the first embodiment.

FIG. 5 is a flowchart showing an example of a wireless communication control method according to the first embodiment.

Figure 6:
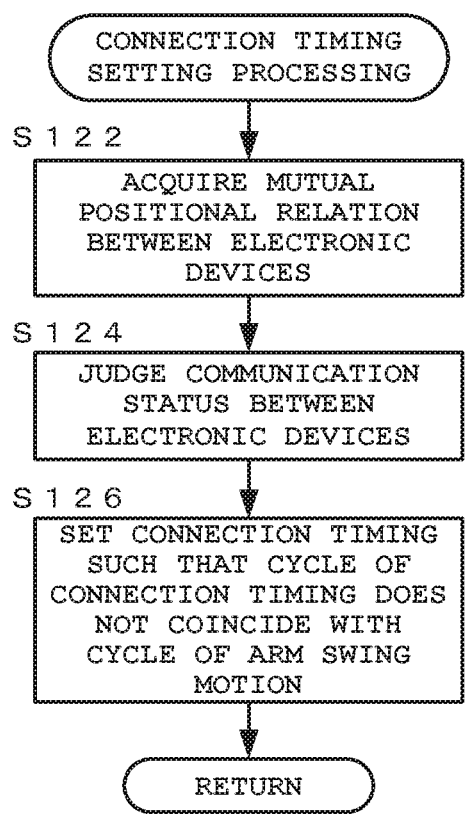
FIG. 6 is a flowchart showing an example of connection timing setting processing applied in the first embodiment.

FIG. 6 is a flowchart showing an example of connection timing setting processing applied in the present embodiment.

FIG. 7A to FIG. 7F are schematic diagrams showing a relation between an arm swing motion during a walking exercise and the signal waveforms of acceleration data.

Figures 8A, 8B, 8C:
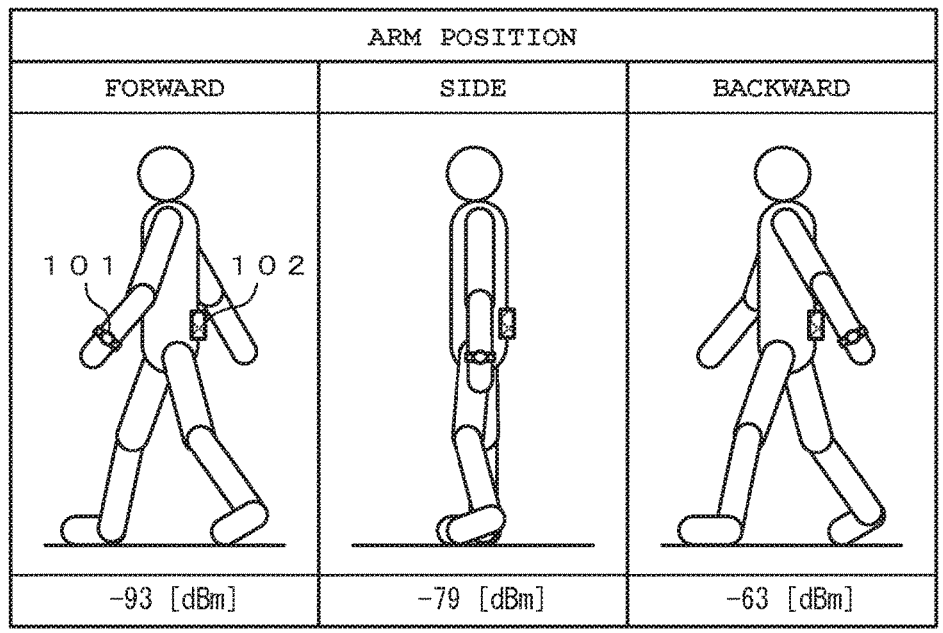
FIG. 8A, FIG. 8B, and FIG. 8C are actual measurement data, which show an example of a relation between the position of the electronic device and radio field intensity in wireless communication.

FIG. 8A, FIG. 8B, and FIG. 8C are actual measurement data, which show an example of a relation between the position of the electronic device and radio field intensity in wireless communication.

Figure 9A:
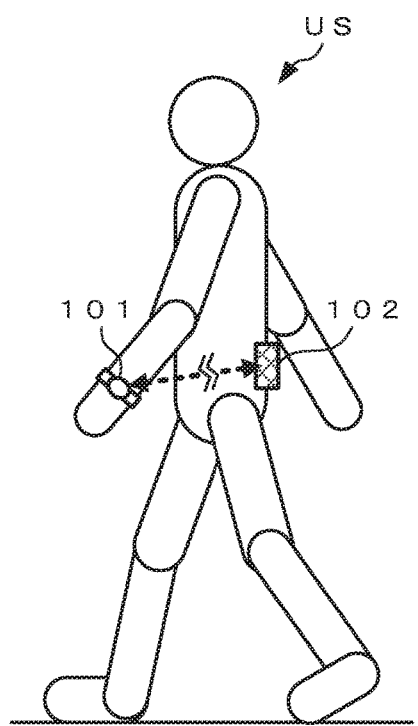
FIG. 9A and FIG. 9B are schematic diagrams for describing an effect of a positional relation between electronic devices on wireless communication.
Figure 9B:
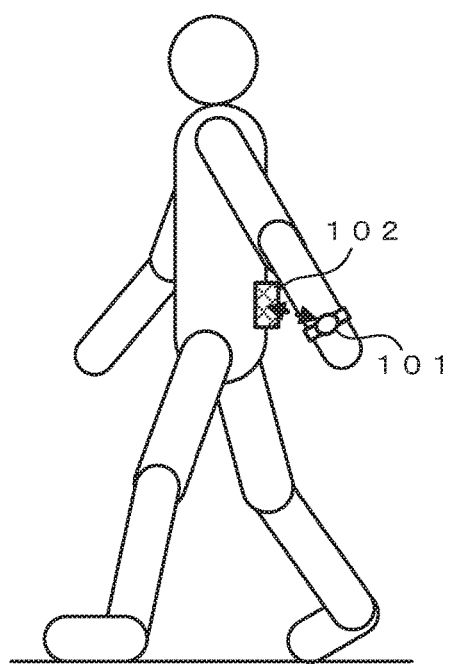

FIG. 9A and FIG. 9B are schematic diagrams for describing an effect of a positional relation between electronic devices on wireless communication.

Figure 10:
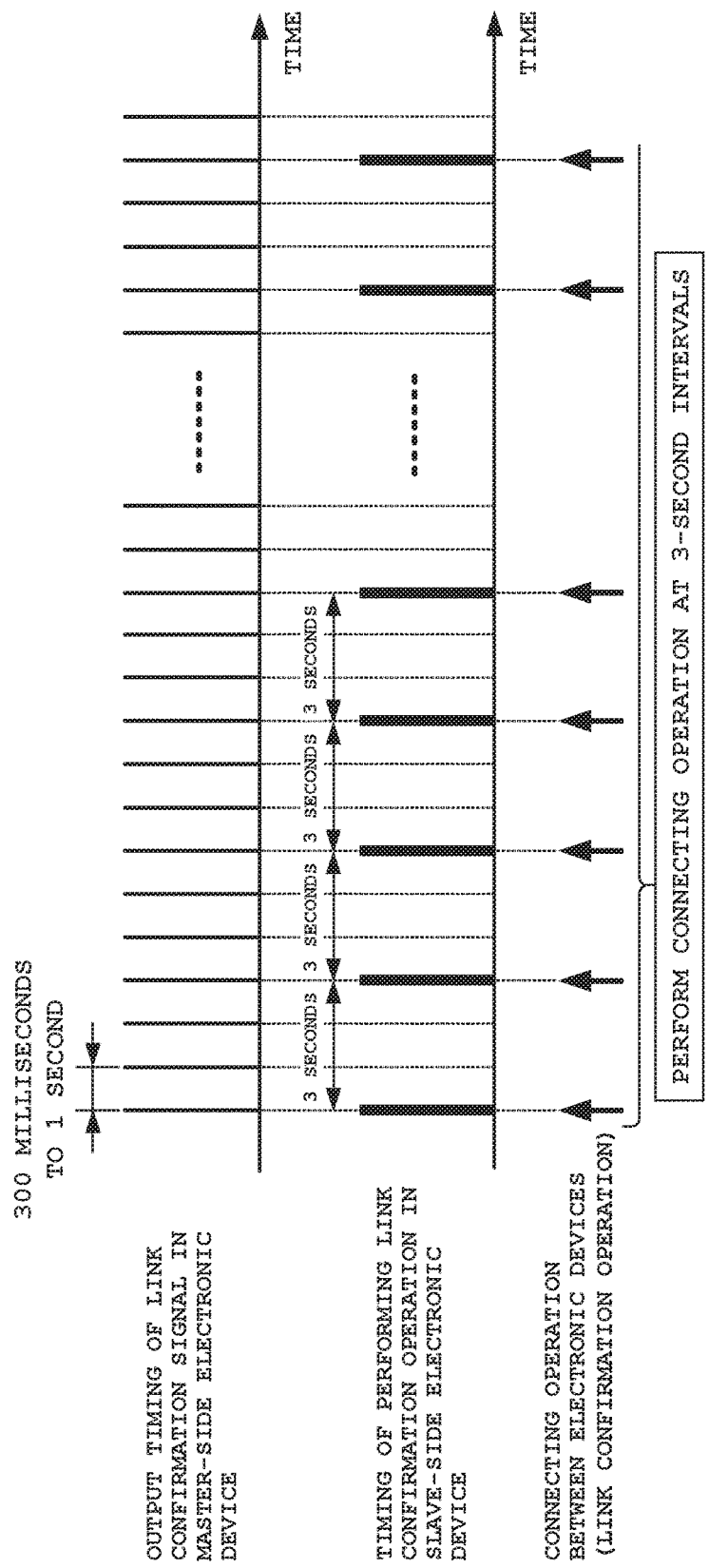
FIG. 10 is a timing chart showing an example of general connection timings in a wireless communication operation between electronic devices.

FIG. 10 is a timing chart showing an example of general connection timings in a wireless communication operation between electronic devices.

Figure 11:
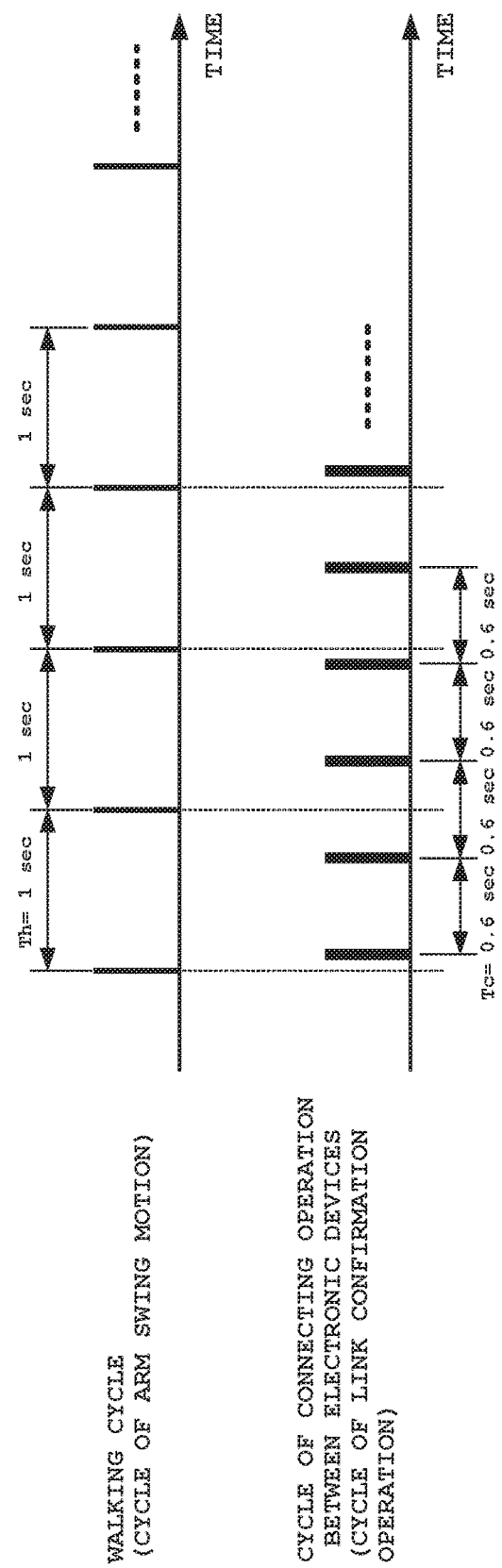
FIG. 11 is a first timing chart showing an example of a relation between arm swing motions and connection timings in a wireless communication operation between electronic devices in a wireless communication control method according to the first embodiment.
Figure 12:
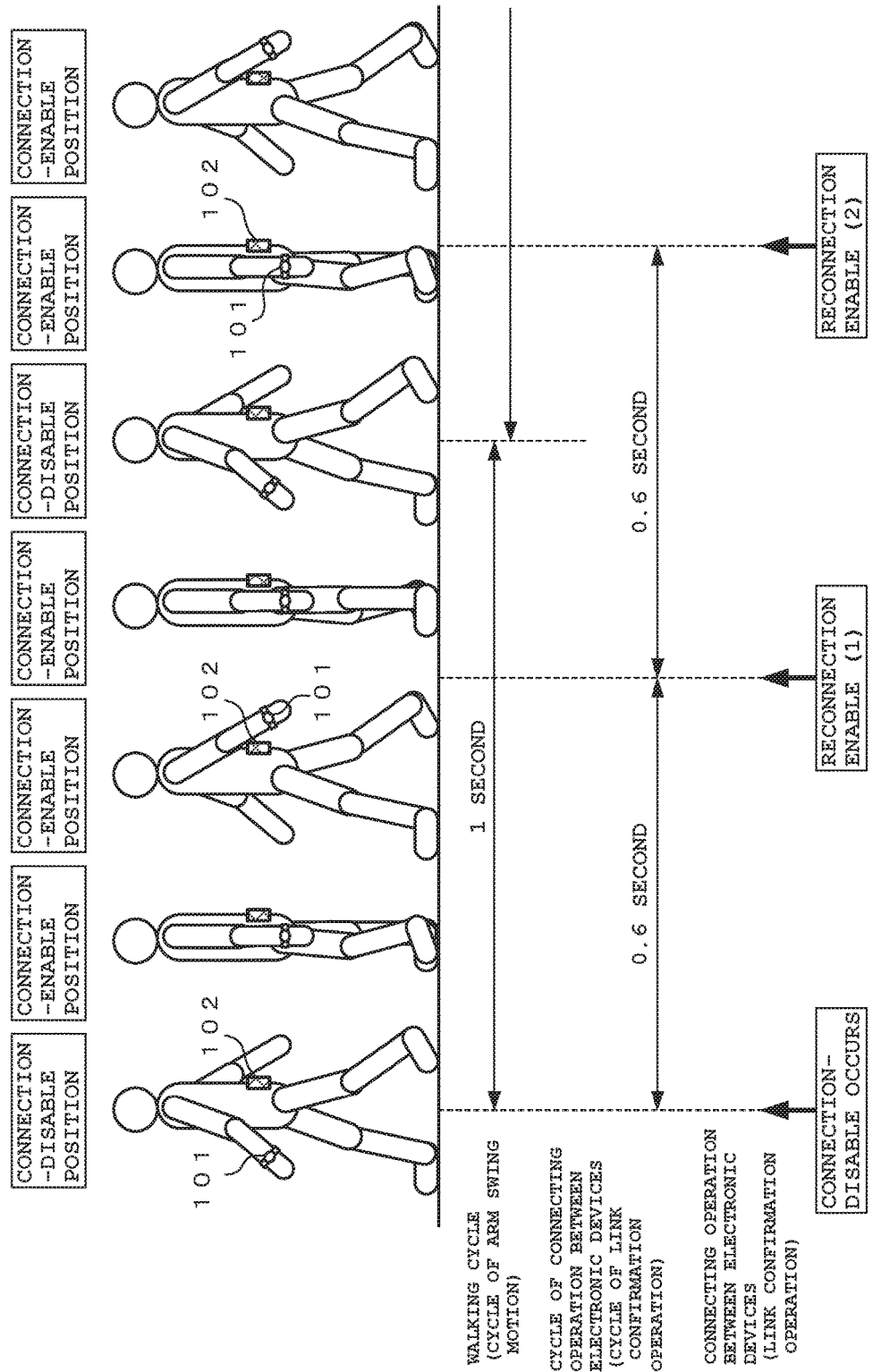
FIG. 12 is a second timing chart showing an example of the relation between arm swing motions and connection timings in a wireless communication operation between electronic devices in the wireless communication control method according to the first embodiment.

FIG. 11 and FIG. 12 are timing charts showing an example of a relation between arm swing motions and connection timings in a wireless communication operation between electronic devices in a wireless communication control method according to the first embodiment.

In the wireless communication control method according to the present embodiment, first, the user US operates the input operating section 120 of each of the first electronic device 101 and the second electronic device 102 to power ON, wears the first electronic device 101 on the wrist USh, and puts the second electronic device 102 in the bag BAG.

Then, when starting a walking exercise, the user US operates the input operating section 120 of each of the first electronic device 101 and the second electronic device 102, whereby the control section 150 starts a wireless communication operation between the first electronic device 101 and the second electronic device 102 (Step S102), and causes the sensor section 110 of the first electronic device 101 to start a sensing operation (Step S104), as shown in the flowchart of FIG. 5.

Note that the above-described wireless communication operation and sensing operation may be started simultaneously or may be started at different timings.

Specifically, when the first electronic device 101 and the second electronic device 102 are connected by Bluetooth (registered trademark) communication, for example, the second electronic device 102 is taken as a master side and the first electronic device 101 is taken as a slave side, and a link confirmation signal is outputted from the second electronic device 102 on the master side in a predetermined cycle (for example, at 300-millisecond to 1-second intervals).

Then, by the first electronic device 101 on the slave side performing a link confirmation operation on the link confirmation signal received via the communication circuit section 140, wireless communication between the first electronic device 101 and the second electronic device 102 is established for mutual connection therebetween.

Here, between the first electronic device 101 and the second electronic device 102, for example, wireless communication is performed with previous (or immediately-preceding) connection timing set by connection timing setting processing described below being taken as an initial state.

Alternatively, wireless communication is performed with a state where a link confirmation operation by the electronic device on the slave side (corresponding to the first electronic device 101) has been synchronized with the output timing of a link confirmation signal outputted from the electronic device on the master side (corresponding to the second electronic device 102) and the cycle has been set to be several times as long as the interval of the output timing (for example, three times as long as one second; three-second intervals) being taken as an initial state, as shown in FIG. 10.

In a sensing operation in the sensor section 110 of the first electronic device 101, for example, sensor data (acceleration data) is acquired by the acceleration sensor at a predetermined sampling frequency and stored in a predetermined storage area of the memory section 160 in association with time data.

Next, the control section 150 of the first electronic device 101 acquires the cycle of an arm swing motion of the walking user US based on the sensor data acquired by the sensor section 110 and stored in the memory section 160 (Step S106).

Specifically, the behavior of the arm swing motion of the walking user US can be grasped by, for example, measuring specific components of the sensor data (acceleration data) acquired by the sensor section 110 (for example, acceleration sensor) of the first electronic device 101 worn on the wrist USh.

Figures 7A, 7B, 7C, 7D, 7E:
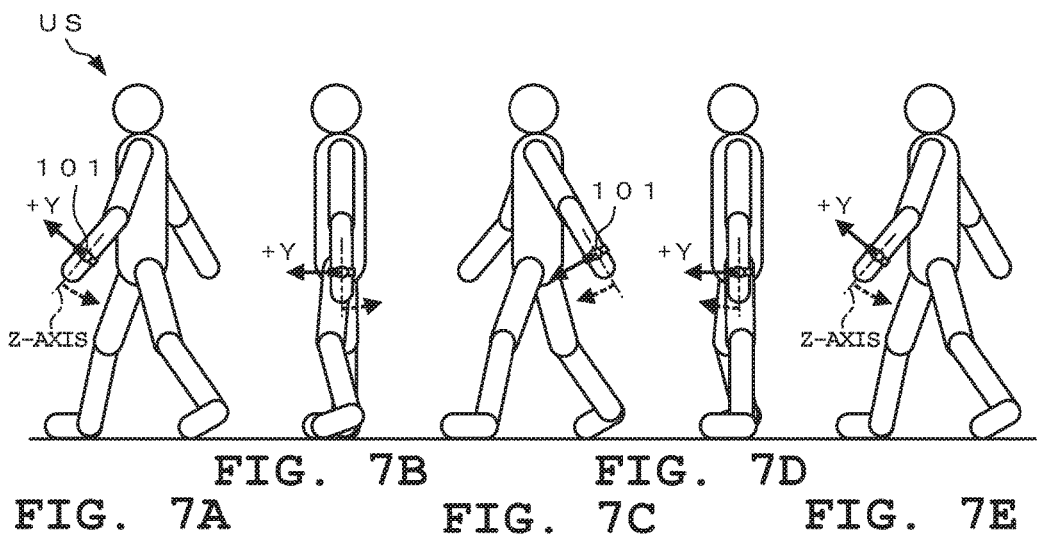
FIG. 7A to FIG. 7F are schematic diagrams showing a relation between an arm swing motion during a walking exercise and the signal waveforms of acceleration data.
Figure 7F:
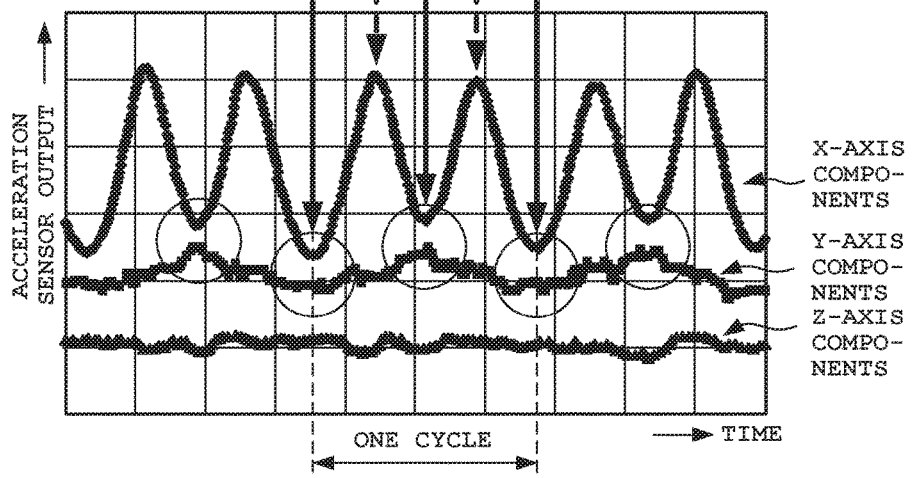

In the case where an acceleration sensor has been applied as the motion sensor, when a walking exercise is performed with the three axis directions being set as shown in FIG. 4, acceleration components (X-axis components) in the X-axis direction outputted from the acceleration sensor show a behavior where an output value is relatively significantly changed in a substantially constant cycle, as shown in FIG. 7F.

Here, when the arm having the first electronic device 101 worn thereon is swung forward (leftward in the drawing) as shown in FIG. 7A and FIG. 7E or is swung backward (rightward in the drawing) as shown in and FIG. 7C, gravitational acceleration components are dispersed, and therefore the output value of the X-axis components decreases to a minimum value.

On the other hand, when the arm is lowered toward the ground direction (downward in the drawing) and positioned right beside the body during arm swinging as shown in FIG. 7B and FIG. 7D, gravity acceleration is directly added, and therefore the output value of the X-axis components increases to a maximum value.

Acceleration components in the Y-axis direction (Y-axis components) outputted from the acceleration sensor show a behavior where an output value is changed relatively slightly in a substantially constant cycle, as shown in FIG. 7F.

Here, when the arm is swung forward (leftward in the drawing) as shown in FIG. 7A and FIG. 7E, a swing-back force is added to a direction (indicated by a dotted arrow line in the drawing) orthogonal to the arm extending direction (X-axis) and opposite to the +Y-axis direction that is a traveling direction (forward) (indicated by a solid arrow line in the drawing). Therefore, the output value of the Y-axis components slightly decreases to a minimum value.

On the other hand, when the arm is swung backward (rightward in the drawing) as shown in FIG. 7C, a swing-out force is added to the same direction (indicated by a dotted arrow line in the drawing) as the +Y-axis direction (indicated by a solid arrow line in the drawing). Therefore, the output value of the Y-axis components slightly increases to a maximum value.

As a result, based on the behavior of sensor data such as that shown in FIG. 7F, the control section 150 judges the state where the output value of the X-axis components indicates a minimum value and the output value of the Y-axis components indicates a minimum value as a state where the arm having the first electronic device 101 worn thereon has been swung forward. On the other hand, the control section 150 judges the state where the output value of the X-axis components indicates a minimum value and the output value of the Y-axis components indicates a maximum value as a state where the arm has been swung backward.

Then, based on the timing of judging these states, the control section 150 acquires a time for one cycle of the arm swing motion as shown in FIG. 7A to FIG. 7E.

The acquired cycle of the arm swing motion is stored in a predetermined storage area of the memory section 160.

Next, based on the acquired cycle of the arm swing motion, the control section 150 sets appropriate connection timing in a wireless communication operation (Step S108).

Specifically, the control section 150 first acquires a mutual positional relation between the first electronic device 101 and the second electronic device 102 based on the cycle of the arm swing motion of the user US acquired at Step S106 and the status of the arm swing motion at each timing of the cycle shown in FIG. 7A to FIG. 7E (such as the state in which the arm having the first electronic device 101 worn thereon has been swung forward, the state in which the arm has been swung backward, or the state in which the arm has been oriented toward the ground direction) (Step S122), as shown in the flowchart of FIG. 6.

Then, the control section 150 judges whether the positional relation between the first electronic device 101 and the second electronic device 102 has achieved a favorable communication status where connection by a wireless communication operation is stable (Step S124).

Here, the communication status between the first electronic device 101 and the second electronic device 102 can be grasped by actually measuring radio field intensity between the electronic devices.

For example, radio field intensity between the first electronic device 101 and the second electronic device 102 when the user US is walking with the first electronic device 101 being worn on a wrist and the second electronic device 102 being worn on the waist on the back side is significantly changed in accordance with the positional relation between the first electronic device 101 and the second electronic device 102, as shown in FIG. 8A, FIG. 8B, and FIG. 8C.

Here, according to verification of the inventor, the following results were acquired. That is, in a state where an arm having the first electronic device 101 worn thereon has been swung forward as shown in FIG. 8A, a very weak radio field intensity such as −93 dBm is acquired, the communication status between the first electronic device 101 and the second electronic device 102 is unstable and poor, and the possibility that connection cannot be made is high.

These actual measurement results are due to the fact that, in a state where the arm has been swung forward as shown in FIG. 9A, a distance between the first electronic device 101 and the second electronic device 102 is long (far) and the radio field intensity is weakened by the body that is a shield against electric waves being interposed between the first electronic device 101 and the second electronic device 102.

By contrast, in a state where the arm has been swung backward as shown in FIG. 8C, the radio field intensity is, for example, −63 dBm. In a state where the arm has been lowered toward the ground direction and positioned right beside the body as shown in FIG. 8B, the radio field intensity is, for example, −79 dBm. In this state, the radio field intensity is improved as compared to the state where the arm has been swung forward. As a result, a stable and favorable communication status and a high probability of connection can be acquired.

These actual measurement results are due to the fact that, in a state where the arm has been swung backward as shown in FIG. 9B, a distance between the first electronic device 101 and the second electronic device 102 is short (near) and the radio field intensity is increased by the body that is a shield against electric waves not being interposed between the first electronic device 101 and the second electronic device 102.

Accordingly, when the above-described measurement results are applied, the control section 150 can judge whether the communication status between the first electronic device 101 and the second electronic device 102 is favorable by taking a range of radio field intensities from, for example, −80 dBm to −90 dBm as a boundary.

In this case, a communication status in a period corresponding to a substantially ¾ of one cycle of the arm swing motion in the walking exercise (motion period from FIG. 7B to FIG. 7D) is judged as favorable.

Note that the control section 150 can judge whether the communication status between the electronic devices is favorable based on measurement results acquired when wireless communication is actually performed between the first electronic device 101 and the second electronic device 102. Alternatively, in a case where the attachment positions of the first electronic device 101 and the second electronic device 102 have been determined in advance and the results of a simulation experiment performed in advance with these attachment positions are available, the above-described judgment may be performed based on the results of the experiment.

Next, the control section 150 sets timing for performing a link confirmation operation in the first electronic device 101 (connection timing) in the period where the communication status is judged to be favorable (corresponding to a motion period in FIG. 7B to FIG. 7D), and sets the interval (cycle) of connection timings at a value that does not coincide with the cycle of the arm swing motion, that is, a value different from the cycle of the arm swing motion (Step S126).

That is, in a case where the interval of timings for performing a link confirmation operation in the first electronic device 101 coincides with the cycle of the arm swing motion as shown in FIG. 10, if the timing for performing a link confirmation operation (connecting operation between the electronic devices) and the timing of an arm's forward-swing motion (motion status in FIG. 7A and FIG. 7E) overlap (coincide) with each other, a state where the communication status between the first electronic device 101 and the second electronic device 102 is poor is repeated every time, whereby a state where communication cannot be made is continued.

In general, when this communication-disable state continues equal to or more than a predetermined time (timeout time), the connection state between electronic devices is cancelled, and the wireless communication operation is forcibly terminated.

By contrast, in the present embodiment, the cycle of an arm swing motion that is the motion cycle of a walking exercise and the interval (cycle) of timings for performing a link confirmation operation that is the cycle of a connecting operation between electronic devices do not coincide with each other, and are set at different values.

For example, when the cycle Th of the arm swing motion acquired at the above Step S106 is one second as shown in FIG. 11, the interval (cycle) Tc of timings for performing a link confirmation operation is set shorter than the cycle Th of the arm swing motion, such as 0.6 seconds to 0.7 seconds (0.6 to 0.7 times as long as Th).

As a result, the positional relation between the first electronic device 101 and the second electronic device 102 is changed every time for each timing of performing a link confirmation operation, as shown in FIG. 11. Thus, the probability that a link confirmation operation is performed with a relatively strong radio field intensity (motion status in FIG. 7B to FIG. 7D; specific state) for connection is increased, and a state where wireless communication has been established between the first electronic device 101 and the second electronic device 102 (connection state) continues.

Note that the interval Tc of timings for performing a link confirmation operation is not limited to the above-described interval set shorter than the cycle Th of the arm swing motion, and may be set longer than the cycle Th of the arm swing motion (for example, 1.2 to 1.3 times longer than Th).

That is, a scaling factor for the interval Tc of timings for performing a link confirmation operation may be set to an arbitrary scaling factor that is not an integral multiple of the cycle Th of the arm swing motion.

Here, when the interval (cycle) of timings for performing a link confirmation operation is set as described in the present embodiment, and a link confirmation operation is repeated, the timing of performing a link confirmation operation (connecting operation between the electronic devices) and the period of the state of the arm's forward-swing motion with a weak radio field intensity (period indicated as "connection-disable position" in FIG. 12) may overlap or become analogous to each other, as shown in FIG. 12.

In this case, there is a possibility that the communication status between the first electronic device 101 and the second electronic device 102 is degraded and the connection is disabled (indicated as "connection-disable occurs" in FIG. 12).

However, in the present embodiment, the above-described setting has been made in which the cycle of an arm swing motion and the interval (cycle) of timings for performing a link confirmation operation do not to coincide with each other.

As a result, the positional relation between the first electronic device 101 and the second electronic device 102 is changed every time for each timing of performing a link confirmation operation, as shown in FIG. 12.

Therefore, even if a state occurs in which the timing of performing a link confirmation operation and the state of the arm's forward-swing motion overlap with each other, subsequent link confirmation operations are performed in a period of a state of an arm swing motion with a relatively strong radio field intensity (a period indicated as "connection-enable position" in FIG. 12) (indicated as "reconnection enable (1)" and "reconnection enable (2)" in FIG. 12). Therefore, the first electronic device 101 and the second electronic device 102 are connected again with a favorable communication status.

Next, the control section 150 judges whether the connection timing (timing of performing link confirmation operation and its cycle) of a wireless communication operation newly set at Step S108 has been changed from (set to be different from) the currently set connection timing (Step S110).

When the connection timing has been changed (Yes at Step S110), the control section 150 changes the current connection timing to the connection timing newly set at Step S108 (Step S112).

The newly-set connection timing is stored in a predetermined storage area of the memory section 160.

On the other hand, when the connection timing has not been changed (No at Step S110), the control section 150 maintains the current connection timing, and returns to Step S108 to repeat processing of setting appropriate connection timing for a wireless communication operation based on the cycle of the arm swing motion acquired based on the sensor data.

Next, based on the changed connection timing, the control section 150 performs a wireless communication operation between the first electronic device 101 and the second electronic device 102 (Step S114).

As a result, the control section 150 transmits and receives, between the first electronic device 101 and the second electronic device 102, the sensor data acquired by the sensor section 110 and various information and data regarding the exercise status of the user US acquired based on the sensor data, via the communication circuit section 140.

Then, the control section 150 returns to Step S102 to periodically repeat the above-described series of processing operations until when a judgment to end the wireless communication operation is made at Step S116.

In the above-described wireless communication control method, as sensor data for acquiring the cycle of the user's arm swing motion, acceleration data is used. However, the present invention is not limited thereto.

In the present invention, another sensor data such as angular velocity data, geomagnetic data, atmospheric data, or the like may be singly used or a plurality of pieces of sensor data may be used in combination as long as a detection signal is periodically changed in accordance with the motion, orientation, and the like of a body having the first electronic device 101 worn thereon.

Also, the wireless communication method applied between the electronic devices is not limited to Bluetooth (registered trademark) communication. Any wireless communication method such as Bluetooth (registered trademark) LE communication, wireless LAN communication, or NFC may be applied as long as one electronic device can perform a link confirmation operation based on a link confirmation signal periodically outputted from the other electronic device.

As described above, in the present embodiment, the cycle of the user's arm swing motion (the change pattern of a positional relation between the first electronic device 101 worn on the wrist USh and the second electronic device 102 accommodated in the bag BAG) is acquired based on sensor data acquired by the sensor section 110.

Then, based on the acquired cycle of the user's arm swing motion, connection timing for a wireless communication operation between the electronic devices is set.

Here, in the present embodiment, by setting the interval (cycle) of timings for performing a link confirmation operation in the first electronic device 101 such that it is shifted so as not to coincide with (so as to be different from) the cycle of the user's arm swing motion, a state with low connectability and a weak radio field intensity between the electronic devices is avoided, and link confirmation operation is performed during a period in which the radio field intensity is relatively strong and favorable connection can be made.

As a result of this configuration, even when an electronic device is being carried by a user or being worn on the body for use, it is possible to avoid a state in which a link confirmation operation is repeated with a weak radio field intensity between electronic devices and low connectability, whereby communication quality can be improved with a high probability of the connection state between the electronic devices being kept.

Also, since the method has been adopted in which a user's periodic motion is grasped based on sensor data acquired by a motion sensor provided in an electronic device, communication quality between electronic devices can be improved without users of an electronic device according to the present embodiment and the position or method of wearing or carrying the electronic device being limited.

Second Embodiment

Next, a second embodiment of the electronic device according to the present invention is described with reference to the drawings.

Figure 13:
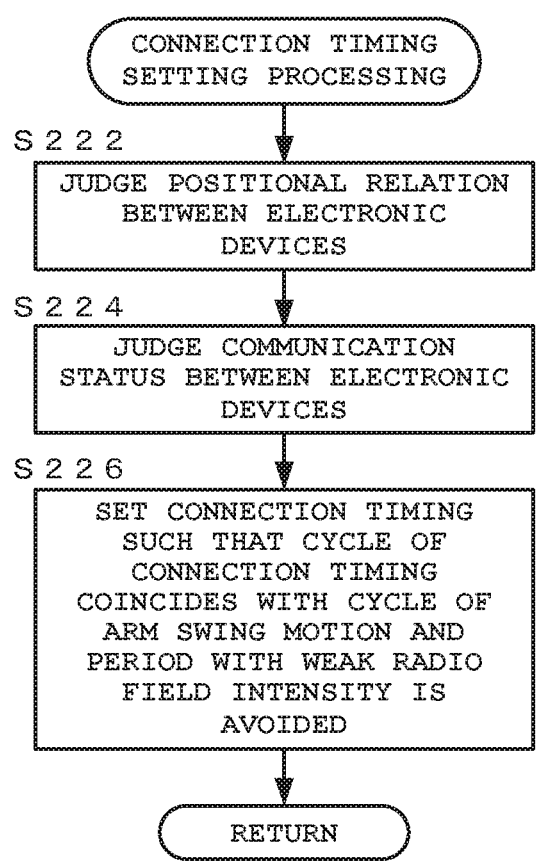
FIG. 13 is a flowchart showing an example of connection timing setting processing applied in a wireless communication control method according to a second embodiment.

FIG. 13 is a flowchart showing an example of connection timing setting processing applied in a wireless communication control method according to the second embodiment.

FIG. 14 is a timing chart showing an example of a relation between arm swing motions and connection timings in a wireless communication operation between electronic devices in the wireless communication control method according to the second embodiment.

Note that descriptions of processing operations equivalent to those of the first embodiment are simplified or omitted herein.

In the above-described first embodiment, connection timing for a wireless communication operation between the electronic devices is set based on the cycle of the user's arm swing motion such that the interval (cycle) of timings for performing a link confirmation operation in the first electronic device 101 does not coincide with the cycle of the arm swing motion.

In one feature of the second embodiment, when the above connection timing is to be set, the interval (cycle) of timings for performing a link confirmation operation in the first electronic device 101 is set to coincide with the cycle of the arm swing motion, and the timing of performing a link confirmation operation is set in a period with a relatively strong radio field intensity between the electronic devices and high connectability so as to avoid a period with a relatively weak radio field intensity between the electronic devices and low connectability.

In the second embodiment, the following processing operations are performed in the processing of setting connection timing for a wireless communication operation between the electronic devices (Step S108) applied in the wireless communication control method described in the first embodiment (refer to the flowchart of FIG. 5).

That is, as with the above-described first embodiment, the control section 150 first judges a positional relation between the electronic devices based on the cycle of the user's arm swing motion and a motion status at each timing (Step S222), and then judges a communication status between the electronic devices based on the positional relation (Step S224), as shown in the flowchart of FIG. 13.

Next, the control section 150 sets timing for performing a link confirmation operation in the first electronic device 101 in a period judged as having a favorable communication status (in a period indicated as "connection-enable position" in FIG. 14) such that the interval (cycle) of timings for performing a link confirmation operation coincides with the cycle of the user's arm swing motion (Step S226), as shown in FIG. 14.

For example, when the cycle Th of an arm swing motion is one second as shown in FIG. 14, the interval (cycle) Tc of timings for performing a link confirmation operation is set at one second that is equal to the cycle Th of the arm swing motion.

As a result, a link confirmation operation (connecting operation between the electronic devices) is performed every time in a specific period having an operation status with a relatively strong radio field intensity and favorable connectability in one cycle of the user's arm swing motion, and a state where wireless communication has been established (connection state) between the first electronic device 101 and the second electronic device 102 is continued.

As a result of this configuration, even when an electronic device is being carried by a user or being worn on the body for use, it is possible to avoid a state in which a link confirmation operation is repeated with a weak radio field intensity between electronic devices and low connectability, whereby communication quality can be improved with a high probability of the connection state between the electronic devices being kept, as with the above-described first embodiment.

While the present invention has been described with reference to the preferred embodiments, it is intended that the invention be not limited by any of the details of the description therein but includes all the embodiments which fall within the scope of the appended claims.

What is claimed is:

1. An electronic device comprising:
a wireless communication circuit configured to be controlled to intermittently execute connection with another electronic device by wireless communication;
one or more sensors configured to detect movement of the electronic device and to output sensor data related to the movement of the electronic device; and
a controller configured to:
determine a cycle of a periodic positional movement of the electronic device based on the sensor data;
determine a period within the cycle of the periodic positional movement of the electronic device where a communication status between the wireless communication circuit and the another electronic device is sufficient for the wireless communication circuit to execute the connection with the another electronic device;
set a connection timing at which the wireless communication circuit is controlled to execute the connection with the another electronic device so that the connection is performed at the period determined;
set a connection-disable timing outside the period determined;
control the wireless communication circuit to execute the connection with the another electronic device at the connection timing set; and
at the connection-disable timing set, control the wireless communication circuit to not execute the connection with the another electronic device.

2. The electronic device according to claim 1,
wherein the electronic device and the another electronic device are configured to be worn or carried on different parts of a user, and
wherein the controller is configured to determine the cycle of the periodic positional movement of the electronic device in accordance with a motion of the user, based on the sensor data.

3. The electronic device according to claim 1,
wherein the controller is configured to set a connection timing cycle for which execution of the connection at the connection timing is repeated, and
wherein a length of the connection timing cycle is different from a length of the cycle of the periodic positional movement of the electronic device.

4. The electronic device according to claim 3,
wherein the controller is configured to change the length of the connection timing cycle when the length of the cycle of the periodic positional movement is changed.

5. The electronic device according to claim 1,
wherein the controller is configured to set a connection timing cycle for which execution of the connection at the connection timing is repeated, and
wherein a length of the connection timing cycle is equal to a length of the cycle of the periodic positional movement of the electronic device.

6. The electronic device according to claim 1,
wherein the controller is configured to:
determine a radio field intensity in the wireless communication between the wireless communication circuit and the another electronic device;
determine one or more relative positions of the electronic device and the another electronic device where the radio field intensity is at or above a predetermined threshold to be one or more relative positions of the electronic device and the another electronic device where the communication status is sufficient; and
set the connection timing at which the wireless communication circuit is controlled to execute the connection with the another electronic device so that the connection is performed at the one or more relative positions where the communication status is sufficient.

7. The electronic device according to claim 1,
wherein the one or more sensors comprise at least one of an acceleration sensor, an angular velocity sensor, a geomagnetic sensor, and an atmospheric sensor.

8. A method for controlling an electronic device comprising a wireless communication circuit configured to be controlled to intermittently execute connection with another electronic device by wireless communication, and one or more sensors configured to detect movement of the electronic device and to output sensor data related to the movement of the electronic device,
wherein the method comprises performing, by a controller:
determining a cycle of a periodic positional movement of the electronic device based on the sensor data;
determining a period within the cycle of the periodic positional movement of the electronic device where a communication status between the wireless communication circuit and the another electronic device is sufficient for the wireless communication circuit to execute the connection with the another electronic device;
setting a connection timing at which the wireless communication circuit is controlled to execute the connection with the another electronic device so that the connection is performed at the period determined;
setting a connection-disable timing outside the period determined;
controlling the wireless communication circuit to execute the connection with the another electronic device at the connection timing set; and
at the connection-disable timing set, controlling the wireless communication circuit to not execute the connection with the another electronic device.

9. The method according to claim 8,
wherein the electronic device and the another electronic device are configured to be worn or carried on different parts of a user, and
wherein the method comprises performing, by the controller, determining the cycle of the periodic positional movement of the electronic device in accordance with a motion of the user, based on the sensor data.

10. The method according to claim 8, comprising:
performing, by the controller, setting a connection timing cycle for which execution of the connection at the connection timing is repeated,
wherein a length of the connection timing cycle is different from a length of the cycle of the periodic positional movement of the electronic device.

11. The method according to claim 10, comprising:
performing, by the controller, changing the length of the connection timing cycle when the length of the cycle of the periodic positional movement changed.

12. The method according to claim 8, comprising:
setting, by the controller, a connection timing cycle for which execution of the connection at the connection timing is repeated, and wherein a length of the connection timing cycle is equal to a length of the cycle of the periodic positional movement of the electronic device.

13. The method according to claim 8, comprising:
determining, by the controller, a radio field intensity in the wireless communication between the wireless communication circuit and the another electronic device;
determining, by the controller, one or more relative positions of the electronic device and the another electronic device where the radio field intensity is at or above a predetermined threshold to be one or more relative positions of the electronic device and the another electronic device where the communication status is sufficient; and
setting, by the controller, the connection timing at which the wireless communication circuit is controlled to execute the connection with the another electronic device so that the connection is performed at the one or more relative positions where the communication status is sufficient.

14. A non-transitory computer-readable storage medium having stored thereon a control program for an electronic device comprising a wireless communication circuit configured to be controlled to intermittently execute connection with another electronic device by wireless communication, and one or more sensors configured to detect movement of the electronic device and to output sensor data related to movement of the electronic device,
wherein the control program is executable by a computer to:
determine a cycle of a periodic positional movement of the electronic device based on the sensor data;
determine a period within the cycle of the periodic positional movement of the electronic device where a communication status between the wireless communication circuit and the another electronic device is sufficient for the wireless communication circuit to execute the connection with the another electronic device;
set a connection timing at which the wireless communication circuit is controlled to execute the connection with the another electronic device so that the connection is performed at the period determined;
set a connection-disable timing outside the period determined;
control the wireless communication circuit to execute the connection with the another electronic device at the connection timing set; and
at the connection-disable timing set, control the wireless communication circuit to not execute the connection with the another electronic device.

15. The non-transitory computer-readable storage medium according to claim 14,
wherein the control program is executable by the computer to set a connection timing cycle for which execution of the connection at the connection timing is repeated, and
wherein a length of the connection timing cycle is different from a length of the cycle of the periodic positional movement of the electronic device.

16. The non-transitory computer-readable storage medium according to claim 15,
wherein the control program is executable by the computer to change the length of the connection timing cycle when the length of the cycle of the periodic positional movement is changed.

17. The non-transitory computer-readable storage medium according to claim 14,
wherein the control program is executable by the computer to set a connection timing cycle for which execution of the connection at the connection timing is repeated, and
wherein a length of the connection timing cycle is equal to a length of the cycle of the periodic positional movement of the electronic device.

18. The non-transitory computer-readable storage medium according to claim 17,
wherein the control program is executable by the computer to:
determine a radio field intensity in the wireless communication between the wireless communication circuit and the another electronic device;
determine one or more relative positions of the electronic device and the another electronic device where the radio field intensity is at or above a predetermined threshold to be one or more relative positions of the electronic device and the another electronic device where the communication status is sufficient; and
set the connection timing at which the wireless communication circuit is controlled to execute the connection with the another electronic device so that the connection is performed at the one or more relative positions where the communication status is sufficient.

* * * * *